United States Patent [19]

Larson

[11] Patent Number: 4,569,042
[45] Date of Patent: Feb. 4, 1986

[54] TIME MEASUREMENTS IN A TRANSMISSION PATH

[75] Inventor: Mikiel L. Larson, St. Charles, Ill.

[73] Assignee: AT&T Bell Laboratories, Murray Hill, N.J.

[21] Appl. No.: 564,758

[22] Filed: Dec. 23, 1983

[51] Int. Cl.[4] .......................... H04J 1/16; H04J 3/14; H04J 3/02
[52] U.S. Cl. ........................................ 370/13; 370/85; 370/60
[58] Field of Search ...................... 370/60, 94, 85, 14; 371/34

[56] References Cited

U.S. PATENT DOCUMENTS

| | | | |
|---|---|---|---|
| 3,587,044 | 6/1971 | Jenkins | 371/62 |
| 4,064,369 | 12/1977 | Battocletti | 179/15 |
| 4,144,414 | 3/1979 | Nicholas | 179/15 |
| 4,195,206 | 3/1980 | Baichtal | 370/14 |
| 4,253,181 | 2/1981 | Watten | 370/103 |
| 4,287,593 | 9/1981 | Stover | 370/103 |
| 4,296,492 | 10/1981 | Hafer | 370/14 |
| 4,314,367 | 2/1982 | Bakka et al. | 370/60 |
| 4,317,195 | 2/1982 | Barberis et al. | 370/94 |
| 4,320,500 | 3/1982 | Barberis et al. | 370/60 |
| 4,346,470 | 8/1982 | Alvarez, III et al. | 370/104 |
| 4,491,945 | 1/1985 | Turner | 370/94 |
| 4,507,778 | 3/1985 | Tan | 370/94 |
| 4,510,600 | 4/1985 | Tan | 370/94 |

OTHER PUBLICATIONS

S. Sone et al., "Extended DDX Packet Switched Network", Japan Telecommunications Review, Apr. 1981, pp. 167–174.
E. Szurkowski, "The Use of Multi-Stage Switching Networks in the Design of Local Network Packet Switches", IEEE International Conference on Communications, 1981, vol. 2, pp. 25.2.1–25.2.5.

Primary Examiner—Douglas W. Olms
Assistant Examiner—Frank M. Scutch, III
Attorney, Agent, or Firm—David Volejnicek

[57] ABSTRACT

In a voice packet switching network (10), following call path set-up, continuity packets (500a–c) are transmitted between the call originating (100) and destination (101) nodes to check call path continuity. The continuity packets carry time stamps of their (503) and the preceding continuity packet's (504) time of transmission, to permit determination of call path transit delay, and computation of asynchrony between clocks (200) of the two nodes. A call path is considered acceptable if one half the path round trip transit delay does not exceed a predetermined maximum acceptable delay. Subsequently transmitted data packets are discarded if their transit delay exceeds the predetermined maximum acceptable delay. Transit delay of a data packet is computed from originating and terminating node clock readings at the time of transmission and reception of the packet, respectively, adjusted for asynchrony of the two clocks.

29 Claims, 10 Drawing Figures

TIME MEASUREMENTS IN A TRANSMISSION PATH

TECHNICAL FIELD

The invention relates to communication systems and to a method and structure for measuring signal transmission delays in such systems.

BACKGROUND OF THE INVENTION

Communication signals transmitted across a communication medium propagate at a finite speed. Hence, the signals encounter delay between the time of their transmission from a source node and the time of their reception by a destination node.

It is often important to know how long the delay is. For example, in synchronous communication systems the delay must be known so that clocks at the source and destination nodes which control the transmission and reception of communication signals, respectively, may be synchronized with each other. And in voice communication systems, where propagation delays degrade the capability of carrying on spontaneous, face-to-face like, conversations and introduce other undesirable effects such as echoes, the delay must be known to determine whether satisfactory communication between nodes is feasible.

In communication systems where signal transmissions from a given source node to a given destination node follow a predetermined and known path, calculation of the transit delay is often a simple matter, even before any signal has been transmitted across the path. The transit delay calculation involves multiplication of the signal propagation characteristic of the transmission medium connecting the source and destination nodes by the distance between those two nodes.

However, in many communication systems this technique cannot be employed, because either the propagation characteristic of the medium or, as is more likely, the distance between the source and destination nodes is not known. In telemetry systems, for example, where the source and destination nodes may be a satellite moving over the surface of the earth and a tracking earth-based antenna, the distance between the source and destination points constantly varies. And in switching networks, such as packet switching networks, for example, there are a number of paths of different lengths that connect the source and destination nodes, and a packetized message may follow any one of these paths; thus, unless a message carries with it information identifying the path it has followed, its transit delay is not easily calculable by the above-described method.

Furthermore, in a switching network such as the packet switching network, a message may be temporarily stored, and hence delayed, at intermediate nodes in the path that it is traversing, thus further increasing the difficulty of determining the delay it has undergone. In this case, the delay cannot be determined from a knowledge of the traversed path alone.

A technique for measuring that portion of the delay time which the message spends at intermediate nodes is disclosed in U.S. patent application Ser. No. 392,377 to W. A. Montgomery, entitled "Time Stamping for a Packet Switching System", filed June 25, 1982, and assigned to the same assignee as this application. The technique involves including a time stamp, of a value known to both the source and destination nodes, in every message sent through the network. The time stamp is updated at every node of the network traversed by the message: when a message enters a node, a relative time stamp is applied, and before the message leaves the node, the relative time is used to find the time spent at the node, which time is added to the original time stamp. At the destination node, the updated time stamp is read and the delay time spent at intermediate nodes is determined therefrom.

This technique unfortunately requires the presence of time-indicating mechanisms—clocks—at each node of the network. It also requires synchronization at each node of the time-indicating mechanism that keeps track of when a message enters the node with the time-indicating mechanism that keeps track of when a message leaves the node. Each node likewise requires a mechanism for computing the difference between these two time-indicating mechanisms and for adding this difference to the original time stamp to update it. These requirements increase the complexity and cost of the nodes, and hence of the network. And furthermore, this technique does not account for the transmission delays accumulated by the message in passing between the various nodes.

One solution in prior art systems has attempted to resolve this problem by including in each packet a time stamp indicating when the packet was transmitted from the originating node. When the packet arrived at the destination node, the delay encountered by the packet was determined by comparing the time in the time stamp with the present time. The problem encountered with this solution was that all of the possible originating and destination nodes had to maintain synchronized clocks. The prior art solution was not a practical solution, since there existed too many technical difficulties in maintaining synchronized clocks over a large number of nodes. And moreover, synchronization and maintenance of synchronization requires that the delay between the nodes already be known.

In view of the foregoing, there exists a need for improved techniques and facilities for determining the delay encountered by a signal as it traverses a transmission path from its origin to its destination.

SUMMARY OF THE INVENTION

This invention is directed toward a method and structure for alleviating these and other disadvantages of the prior art. According to this invention, the process of measuring the signal transmission delay through a transmission path involves transmitting across the path in one direction a first signal indicating time of its transmittal and, in response to receipt of the first signal, transmitting across the path in the other direction a second signal indicating significantly the time of transmittal of the first signal. The round-trip signal transmission delay is then determined as the difference between the time of transmittal of the first signal and the time of receipt of the second signal. The round-trip signal transmission delay is halved to obtain an approximation of the one-way signal transmission delay of the path. The invention is independent of the type of transmission path used, and is applicable to such diverse paths as trunks that interconnect nodes of a packet switching network and the space separating a satellite and its tracking station.

More particularly, the invention is applied to communication systems that include a first and a second communication interface coupled by a transmission path. In such systems, apparatus for determining the round-trip signal transmission delay is associated with each interface. At the first interface, transmitting apparatus transmits through the path a first signal that indicates the time of its transmittal. At the second interface, in response to receiving the first signal, transmitting apparatus transmits through the path a second signal that indicates the time of transmittal of the first signal. Apparatus at the first interface responds to receipt of the second signal and determines the difference between the time of transmittal of the first signal and the time of receipt of the second signal to obtain the round-trip transmission delay. Half of the round-trip delay is then taken as an approximation of the one-way signal transmission delay through the path.

To likewise allow the delay to be determined at the second interface, the above-mentioned second signal also indicates the time of its transmittal. At the first interface, in response to receiving the second signal, the transmitting apparatus transmits through the path a third signal that indicates the time of transmittal of the second signal. Apparatus at the second interface then responds to receipt of the third signal and determines the difference between the time of transmittal of the second signal and the time of receipt of the third signal to obtain at the second interface the round-trip delay.

Advantageously, then, the invention provides an efficient means for measuring the transmission delay time of a communication path. It measures both the inter-node transmission time as well as the intra-node delay time of a signal. Yet it does not require any time-indicating mechanisms—much less synchronized ones—at nodes intermediate to the source and destination nodes, nor does it require a time stamp updating mechanism at each node. The invention furthermore reduces the amount of information required to accompany a signal through a node, by removing the need to carry an arrival time stamp with the signal in each node. Also, by utilizing a signal that must pass end-to-end and then back over the same communication path, the invention provides a continuity check of the path. Both the validity and the delay of the path are thus checked through a common mechanism.

Further advantageously, the calculated transit delay is used to control communications passing between the first and the second interface. At each interface, comparing apparatus compares the one-way transmission delay with a predetermined maximum acceptable one way delay. If the comparing apparatus finds the predetermined delay to be exceeded, it causes associated apparatus to stop further transmissions over the path to the other interface. Thus the invention provides a simple means of overload control in a communication network, in that determination of an unusually long propagation delay signals an overload of the network and allows for postponement of the planned communication, before it has a chance to begin and add to system congestion.

To indicate the times of transmittal and receipt of signals, time indicators, such as clocks, are associated with the interfaces. Synchronization and resynchronization of those clocks with each other is generally very difficult. It is a feature of this invention that to obtain the time period of asynchrony between the time indicators of the interfaces, apparatus at the first interface adds the one-way delay to the time of transmittal of the second signal and then subtracts from the sum the time of receipt of the second signal. The time indicators may then be synchronized by being adjusted by the period of asynchrony. To permit like determination and adjustment at the second interface, the third signal advantageously also indicates the time of its transmittal. Apparatus at the second interface adds the one-way delay to the time of transmittal of the third signal and subtracts from the sum the time of receipt of the third signal to obtain the time period of asynchrony.

Alternatively to being used for synchronization purposes, the time period of asynchrony is also used to control communications passing between the first and the second interface. If transmissions between the interfaces over the path have not been stopped in the above-described manner, apparatus at an interface responds to the receipt of a further signal that was transmitted over the path from the other interface by determining the one-way transmission delay of that further signal. The signal carries indication of the time of its transmittal. The delay of the signal is determined as the difference between the time of transmittal and receipt of the signal, which difference is adjusted by the time period of asynchrony. The comparing apparatus compares the delay of the signal with the predetermined delay. If the predetermined delay is found to be exceeded, the signal is caused to be discarded. Thus signals, generally representing voice communications, that have been unacceptably delayed may be identified and discarded to preserve the overall quality of the communication.

These and other advantages and features of the present invention will become apparent from the following description of the illustrative embodiment of the invention taken together with the drawing.

DETAILED DESCRIPTION

Figure 1:
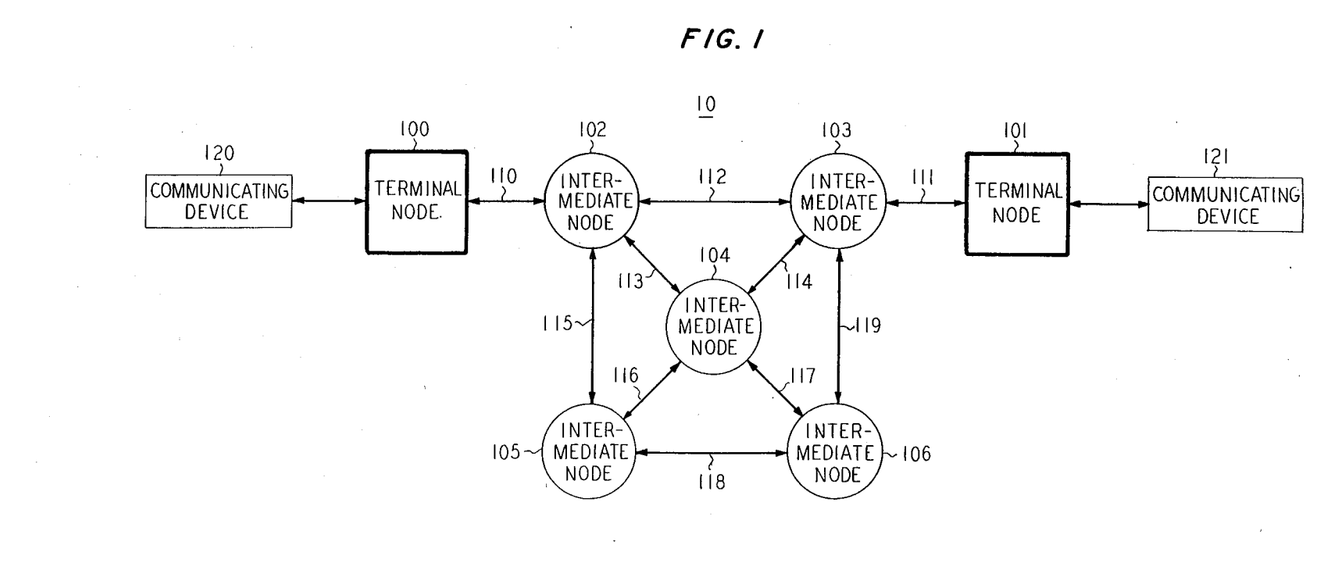
FIG. 1 is a block diagram of an illustrative packet switching communication network including terminal nodes embodying the invention.

To illustrate an embodiment of the invention, in FIG. 1 there is shown a packet switching network 10. Packet switching networks are well known in the art, and therefore the packet switching network 10 is not discussed herein in detail. Only an overview description thereof follows.

As shown in FIG. 1, the packet switching network 10 comprises a plurality of nodes 100–106 interconnected by transmission lines 110–119. An actual network would generally comprise many more nodes and lines, arranged in various configurations. The network 10 is intended to represent in generalized form networks of this nature. The lines 110–119 serve as the communication medium over which packets are transmitted between the nodes 100–106. Two types of nodes are shown in FIG. 1 terminal nodes 100 and 101 and intermediate nodes 102–106. While two terminal nodes 100 and 101 are shown in FIG. 1, again, an actual network would generally include many more terminal nodes, possibly with each intermediate node connected to one or more terminal nodes. The intermediate nodes 102–106 are switching nodes responsible for routing incoming packets through the network 10 toward their proper destinations. The terminal nodes 100 and 101 interface communicating equipment, such as the equipment 120 and 121, respectively, to the network 10. The communicating equipment 120 or 121 may be any desirable equipment, for example a digital telephone end office. Each terminal node 100 and 101 may have a plurality of communicating equipment units connected thereto, but for ease of illustration only one is shown.

A series of transmission lines and intermediate nodes interconnecting a pair of terminal nodes in the network 10 is referred to as a communication path. As can be seen from FIG. 1, there are a plurality of communication paths interconnecting the terminal nodes 100 and 101. Which path a series of packets that form a communication will follow from the terminal node 100 to the terminal node 101, or vice versa, is a function of many factors. These include the congestion of the network 10, the current availability of a particular path's component transmission lines and intermediate nodes, and the protocol followed by intermediate nodes in selecting a path from a source to a destination node.

For purposes of this illustration, the network 10 is a voice packet switching network: the messages carried by message packets through the network 10 predominantly represent telephone calls. Thus, most message packets carry a portion of a digitally-encoded voice message. A stream of digitally-encoded call signals is provided to a terminal node by the associated communicating equipment. The communicating equipment at which the call originates, for example the equipment 120, also provides to the associated terminal node, in this example the node 100, address information specifying the communication equipment to which the call is to be connected, for example the equipment 121, all in a known manner.

In response, a communication path is set up through the system 10 by the originating terminal node 100 by initially sending a call set-up packet to the switching portion of the network 10 comprising the intermediate nodes 102–106. The call set-up packet contains, inter alia, logical address information identifying the destination terminal node, in this example the node 101. The call set-up packet reaches the intermediate node 102, which returns an acknowledgement packet to the node 100. The node 102 also responds to the destination information contained in the packet by selecting, in a known manner, one of the transmission lines 112, 113, or 115 and forwarding the call set-up packet along the selected line to the next intermediate node. That node in turn returns an acknowledgement packet to the node 102 and forwards the call set-up packet onto the next selected node. This process is repeated at each intermediate node that receives the call set-up packet, until the call set-up packet reaches the terminal node 101 through the intermediate node 103. The terminal node 101 conventionally responds by notifying the communicating equipment 121 of an incoming call and returning an acknowledgement packet to the node 100 to complete the call path set-up process.

Further in response to receipt of the set-up packet, each intermediate node in the path stores logical-to-physical address translation information in its memory. The physical address defines the portion of the path from that node to the next node in the path. Upon receipt of each subsequent packet, each intermediate node utilizes this stored information for transferring the packet on to the next node in the previously-established physical path.

Though a physical path through the network 10 has been established for the call, this does not necessarily mean that the path is suited for the transmission of the call. For example, the path may have discontinuities that prevent a packet transmitted by the node 100 from reaching the node 101, or vice versa. Furthermore, the transit time of the path may be unacceptably long. It has been found that delays in transmission of conversation between speaker and listener longer than a predetermined amount, for example 250 milliseconds, degrade the quality of conversation below an acceptable level. Hence it is not desirable to complete calls over paths that introduce a delay greater than the predetermined maximum. For reasons like these, the suitability of the established path for carrying the call must first be determined and the call must be controlled accordingly.

For an understanding of how this determination of suitability and the control of the call is accomplished, attention is first turned to the functional configuration of the terminal nodes 100 and 101. The functional configuration of the node 100 is diagramed in FIG. 2. Only the one node 100 is diagramed, with the understanding that the node 101 and other terminal nodes are equivalent and therefore the discussion of the node 100 applies to all terminal nodes. The node 100 is configured around a logic and control unit 202, which may be an appropriately-programmed processor, for example. The logic and control unit 202 controls the operation of various other functional units of the node 100.

Figure 2:
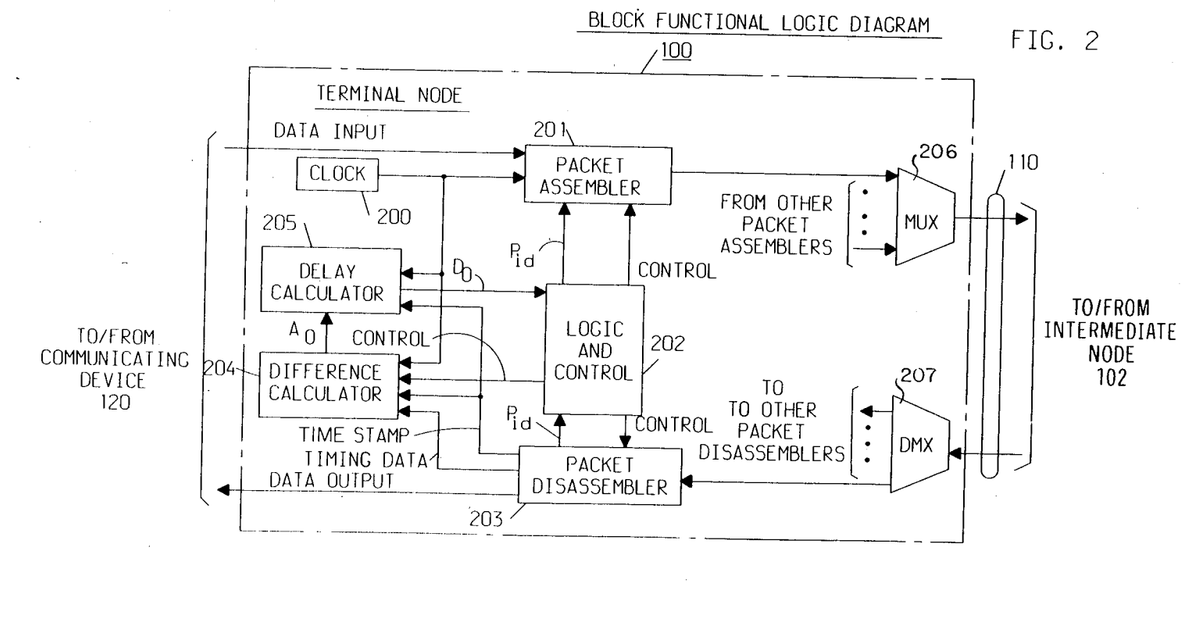
FIG. 2 is a functional block diagram of a terminal node of the network of FIG. 1 that embodies the invention.

The communicating device 120 sends a stream of message signals to the node 100 over a DATA INPUT path, which conducts the signals to a packet assembler 201. Other communicating devices may send signals to other packet assemblers over other DATA INPUT paths. Though logically separate, the various DATA INPUT paths may be implemented in one physical path.

Creation and dismantlement of packets is a function of terminal nodes, and it is in the packet assemblers of a node that packets are created. A packet assembler may be a region of memory, for example. The operation of the packet assemblers is controlled by the logic and control unit 202. In a conventional manner, the logic and control unit 202 creates various packets in the packet assembler 201, including the call set-up packets and message packets containing the message signals received from the device 120. To distinguish the types of packets from each other, each packet carries a packet ID, supplied by the logic and control unit 202, that identifies it as being of one type or another. Various packets also include a time stamp that is indicative of the time of their transmission. The time stamp is obtained by the unit 202 for inclusion in packets from a clock 200. The time stamp represents the current reading of the clock 200.

Assembled packets are channeled out of the packet assembler 201 over a PACKET OUTPUT path to a multiplexer 206. Other packet assemblers are likewise connected to the multiplexer 206 by PACKET OUTPUT paths. The multiplexer 206 multiplexes the packets from the various packet assemblers in a conventional manner and outputs the packet stream to the intermediate node 102 over the transmission line 110. The packets are statistically multiplexed onto the transmission line 110. That is, the multiplexer 206 takes packets from the various packet assemblers in the order in which it receives them, i.e. on a first-come, first-served basis, and sends the packets out in that order onto the line 110.

Packets destined for the node 100, for example packets originating at the node 101 or at some other terminal nodes, are channeled by the network 10 to the intermediate node 102. The intermediate node 102 sends the stream of packets to the node 100 over the trunk 110. The multiplexed stream is input to a demultiplexer 207. The demultiplexer 207 demultiplexes the packets in a conventional manner. Packets associated with various calls are sent out by the demultiplexer 207 over various PACKET INPUT paths. The PACKET INPUT paths channel the packets to packet disassemblers of the node 100. Packets intended for the device 120 are channeled by the associated PACKET INPUT path to a packet disassembler 203.

A packet disassembler may be a region of memory, for example. Packet disassemblers also operate under control of the logic and control unit 202. In the packet disassemblers, the packets are broken down into their component parts, or fields, and various information, including data and control signals, is extracted from the fields. One item of information that is extracted is the packet ID. The logic and control unit 202 examines the packet ID to identify the packet so that it may handle it properly. Another item of information that is extracted from packets is the time stamp. Extracted time stamps are provided to a difference calculator 204 and to a delay calculator 205. Other timing information is extracted from selected packets and provided to the difference calculator 204.

The function of the difference calculator 204 is to determine the time period of asynchrony, i.e., the difference in simultaneous reading, between the clock 200 of the node 100 and the clock of another terminal node, for example the node 101, based upon the current reading of the clock 200 and upon the time stamp and other timing data obtained by the node 100 from a packet received from that other terminal node.

The function of the delay calculator 205 is to estimate the one-way transit delay encountered by a packet received by the node 100 in traveling from another terminal node, for example the node 101. The one-way delay is estimated as one-half of the round-trip signal transit delay determined for the path that has been set-up between the nodes 100 and the other terminal node. Transmit delay calculations are based upon the current reading of the clock 200, the time stamp obtained by the node 100 from a packet received from that other terminal node, and the asynchrony with that other terminal node which is computed by the difference calculator 204.

The difference calculator 204 and the delay calculator 205 may both be implemented as programs executing in the logic and control unit 202.

The value of the estimated one-way delay computed by the delay calculator 205 is compared by the logic and control unit 202 with the value of a predetermined maximum acceptable one-way delay. If the value of the estimated delay exceeds the value of the predetermined maximum acceptable delay, the call path that was established through the network 10 is considered to be bad and the call is not completed over that path. If the estimated delay is acceptable, the call proceeds over the established call path. But if during the call a voice message packet is found to have undergone a delay exceeding the predetermined maximum acceptable delay, the logic and control unit 202 discards the voice message carried by that packet.

During the call, the logic and control unit 202 sends the call message extracted at the packet disassembler 203 from acceptably delayed message packets to the communicating device 120 over a DATA OUTPUT path. Messages from other packet disassemblers are similarly sent to other communicating devices over other DATA OUTPUT paths. As in the case of DATA INPUT paths, the DATA OUTPUT paths are logically separate but may share the same physical path.

Having described the functional configuration of the terminal nodes, attention is now turned to the operation of those nodes. The operation of the nodes 100 and 101 is described in terms of the logic flow of the functions performed by these nodes in processing a communication between the communicating equipment 120 and 121. The logic flow is diagramed in FIGS. 3A–B and 4A–B for the nodes 100 and 101, respectively.

The operation of the system 10 is here described in terms of the functions performed by the terminal nodes 100 and 101. The functionality of these nodes is diagramed in logical flow form in FIGS. 3A–B and 4A–B, respectively.

Figure 3A:
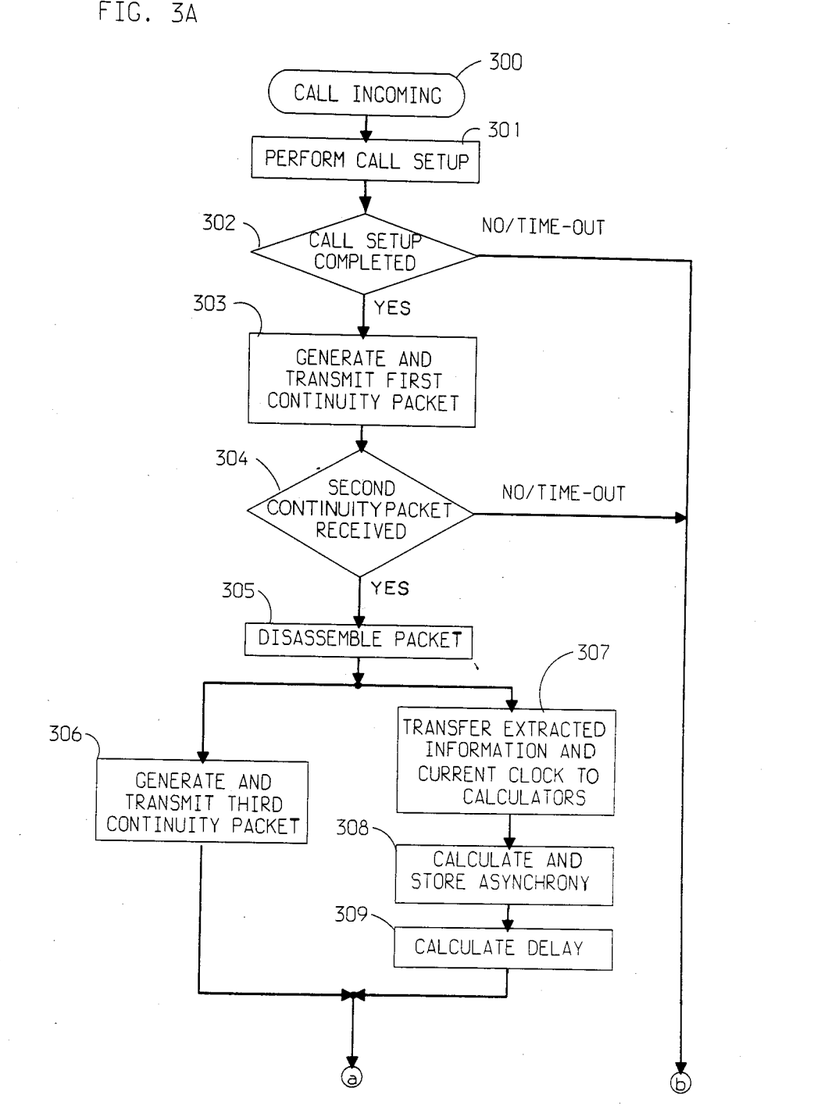
FIGS. 3A and 3B are a logical flow diagram of the operation of the node of FIG. 2 as the source node.

When the terminal node 100 senses a call incoming from the subtending communicating equipment 120 and receives therefrom information about the destination of the call, it responds by setting up the call in a conventional manner, as suggested in blocks 300 and 301 of FIG. 3. Call set-up activities include generation and transmission to the network 10 of a call set-up packet to set up the physical path for the call through the network 10, as was described earlier.

Figure 4A:
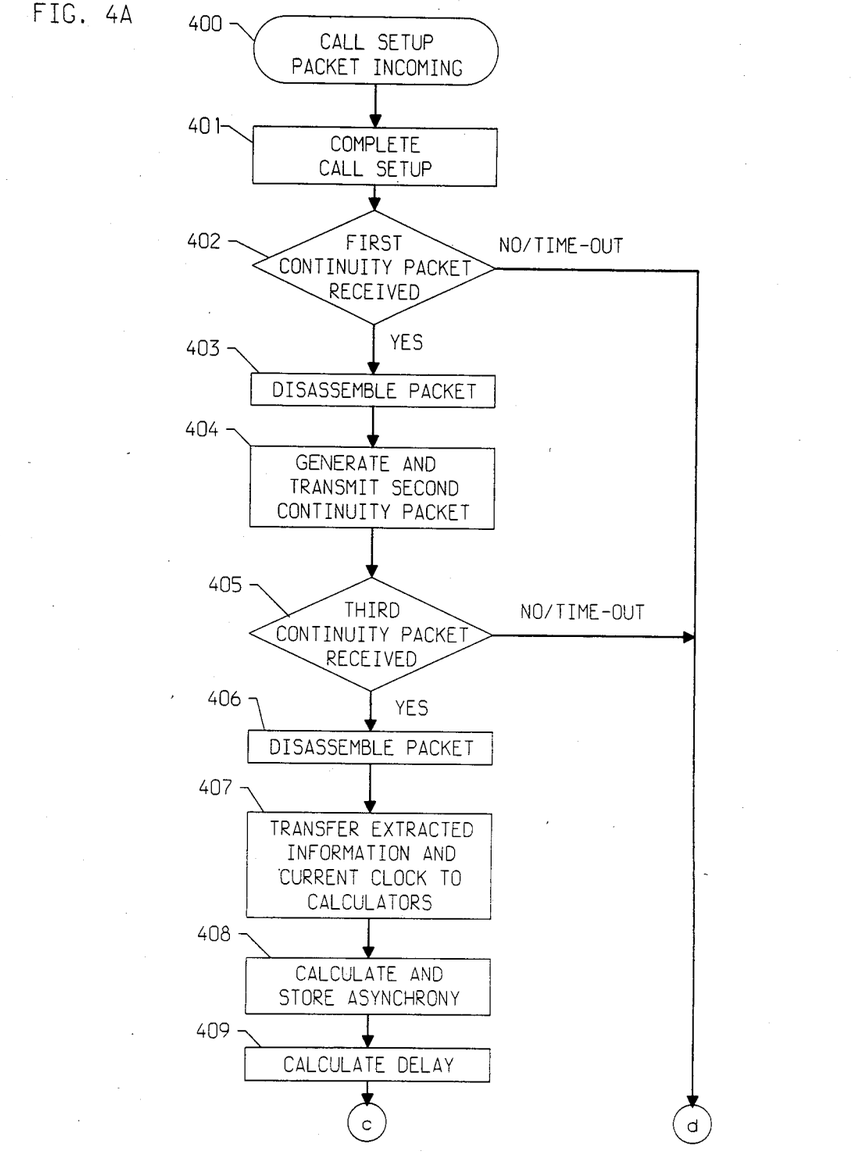
FIGS. 4A and 4B are a logical flow diagram of the operation of the node of FIG. 2 as the destination node.

Assuming that the destination of the call is the communicating equipment 121 subtending the terminal node 101, the terminal node 101 receives the call set-up packet and responds thereto by completing the call set-up in a conventional manner, as suggested in blocks 400 and 401 of FIG. 4A. Completion of call set-up includes activities such as, for example, notifying the device 121 that it has a call incoming, and sending an acknowledgement packet back to the network 10 to indicate that the physical path to the device 121 has been completed.

Figure 3B:
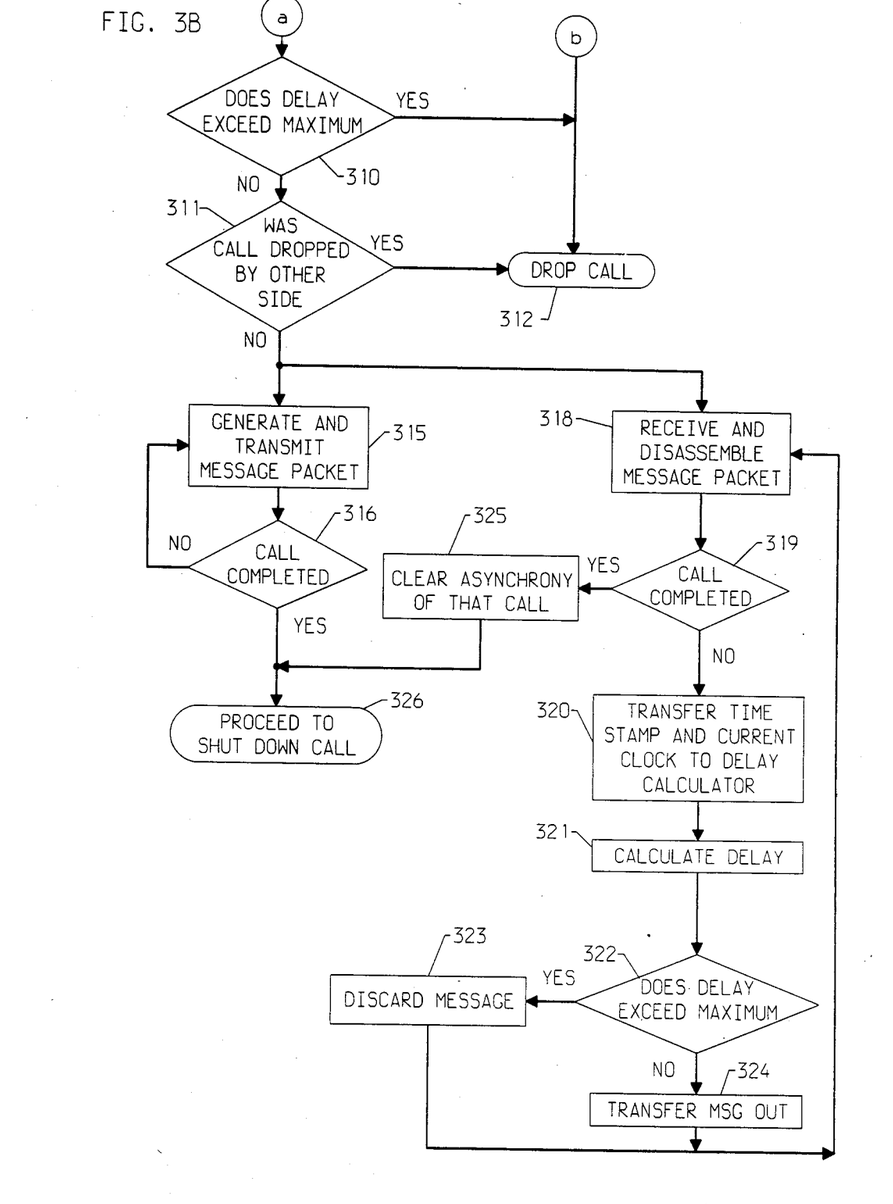

The call-originating terminal node 100 awaits completion of call set-up, as indicated in block 302 of FIG. 3A. If the node 100 does not sense completion of call set-up activities within a predetermined amount of time, indicated, for example, by a timeout timer, the node 100 undertakes conventional activities to drop the call, as indicated in block 312. These activities include, for example, notifying the communicating device 120 that the call cannot be completed and sending a packet to the network 10 informing it to take down the call path that the preceding call set-up packet attempted to set up.

If, however, call set-up is completed within the predetermined time, the node 100 generates a first continuity packet and transmits it to the destination node 101 through the network 10, over the physical path that has just been set up for the call, as suggested in block 303.

The function of continuity packets is twofold. First, they convey information that allows the terminal nodes 100 and 101 to determine the packet transit delay through the network 10 over the call path and the asynchrony, or difference in simultaneous reading, of the clocks of the nodes 100 and 101. And second, they test the continuity of the call path from the node 100 to the node 101 and back again, making sure that the call path will actually convey call data packets between the two nodes 100 and 101.

Figure 5A:
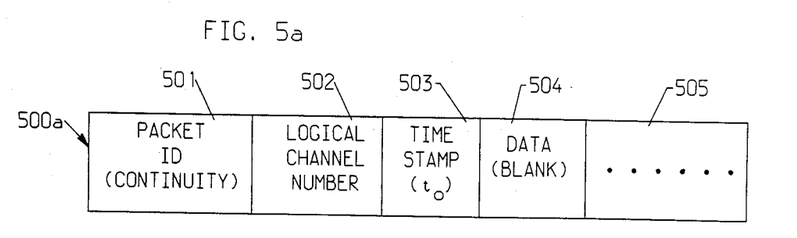
FIGS. 5A–5C are logical configuration diagrams of continuity packets of the network of FIG. 1.

The first continuity packet, denoted as 500a, is shown diagramed in FIG. 5A. As FIGS. 5A-C indicate, the first continuity packet 500a is one of three continuity packets 500a-500c. The continuity packets are divided into a plurality of fields 501-505. A packet identification field 501 specifies the type of packet this is. In the case of all continuity packets, the code held by the field 501 is common and identifies the packets as continuity packets, as opposed to, for example, a call set-up packet or a message packet. A logical channel number field 502 gives indication to the network 10 of the destination of the packet, which is in this example the communicating device 121, and hence the logical channel number field 502 specifies the one physical path—one of many that may be concurrently set up in the network 10—that the packet is to follow. A time stamp field 503 bears the reading of the clock 200 of the node 100 at time of transmission of the packet from the node 100. For purposes of this example, the reading of the clock 200 of the node 100 at the time of transmission of the first continuity packet 500a is assumed to be $t_0$, as indicated in FIG. 5A.

A data field 504 of certain continuity packets contains other timing information, as will be made clear below. But in the case of the first continuity packet 500a, the data field 504 is blank, as shown in FIG. 5A. Continuity packets may contain other fields 505 as well, such as error checking fields, for example. These fields depend upon the particular implementation of the network 10 and hence will not be discussed here.

Returning to FIG. 4A, following completion of call set-up, the node 101 awaits receipt of the first continuity packet 500a, as indicated in block 402. If the first continuity packet 500a is not received by the node 101 within a predetermined period of time, again indicated by a timeout timer, for example, the call path is likely to have a discontinuity that makes it unusable, and therefore the node 101 undertakes conventional activities to drop the call, as indicated in the block 412 and discussed previously in conjunction with the block 312 of FIG. 3B.

If, however, the node 101 does receive the first continuity packet 500a within the predetermined time, it disassembles the packet 500a, as indicated in block 403, to extract therefrom the contents of the time stamp field 503. The node 101 then uses the extracted information to generate a second continuity packet, which it transmits to the node 100 over the call path through the network 10, as suggested in block 404.

Figure 5B:
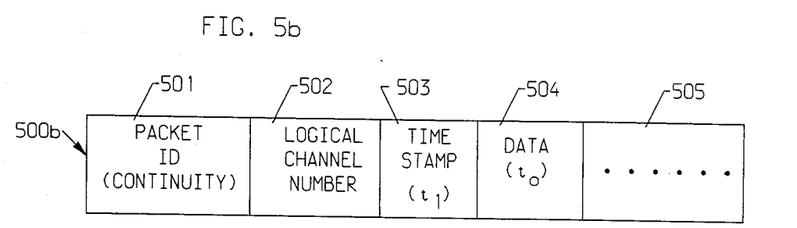

The second continuity packet, designated as 500b, is diagramed in FIG. 5B. The second continuity packet 500b differs from the first continuity packet 500a in that it carries the contents of the time field 503 of the first continuity packet 500a in its data field 504, and its time stamp field 503 bears the reading of the clock of the node 101 at the time of transmission of the second continuity packet 500b from the node 101. For purposes of this example, the reading of the clock of the node 101 at the time of transmission of the second continuity packet 500b is assumed to be $t_1$, as indicated in FIG. 5B.

Considering now FIG. 3, following transmission of the first continuity packet 500a, the node 100 awaits receipt of the second continuity packet 500b, as indicated in block 304. Failure to receive the second continuity packet 500b within a predetermined time period, again indicated by a timeout timer, for example, indicates to the node 100 that the call path is likely to have a discontinuity that makes it unusable, and therefore the node 100 undertakes the activities at the block 312 to drop the call.

If, however, the node 100 does receive the second continuity packet 500b within the predetermined time, the node 100 disassembles the second continuity packet 500b, as indicated in block 305, to extract therefrom the contents of the time stamp field 503 and of the data field 504. Following disassembly, the node 100 uses the extracted contents of the time stamp field 503 of the second continuity packet 500b to generate a third continuity packet, which it transmits to the node 101, as suggested in block 306.

Figure 5C:
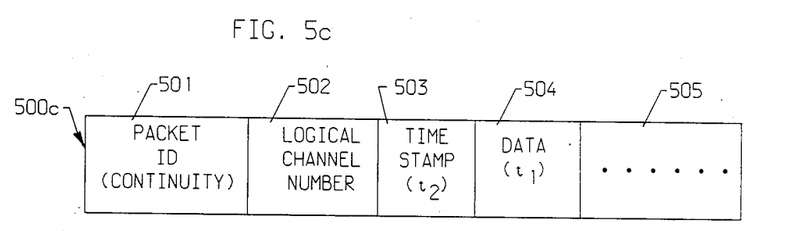

The third continuity packet, designated as 500c, is diagramed in FIG. 5C. The third continuity packet 500c differs from the preceding continuity packets 500a and 500b in that it contains the value of the time stamp field 503 of the second continuity packet 500b in its data field 504, and includes the reading of the clock 200 of the node 100 at the time of transmission of the third continuity packet 500c from the node 100 in the time stamp field 503. For purposes of this example, the reading of the clock 200 of the node 100 at the time of transmission of the third continuity packet is assumed to be $t_2$, as indicated in FIG. 5B.

While the third continuity packet 500c is being assembled and transmitted, information extracted from the second continuity packet 500b and the current reading of the clock 200 are also transferred to the calculators 204 and 205 of the node 100, as indicated in the block 307. The difference calculator 204 receives the contents of the time stamp field 503 and the contents of the data field 504 of the packet 500b. The delay calculator 205 receives the contents of the time stamp field 503 of the packet 500b. Both the difference calculator 204 and the delay calculator 204 receive the current reading of the clock 200. The reading of the clock 200 is the same as is included in the time stamp field 503 of the third continuity packet 500c, which is $t_2$ in this example.

The difference calculator 204 uses the inputs to calculate the asynchrony between the clock 200 of the node 100 and the clock of the node 101, as indicated in block 308. The difference calculator 204 computes the asynchrony as $$A_0 = t_2 - \left( t_1 + \frac{t_2 - t_0}{2} \right) = \frac{t_2 + t_0}{2} - t_1$$

where $A_0$ represents the asynchrony, or difference, between the clocks, $t_0$ is the value of the clock 200 at the time of transmission of the first continuity packet 500a, carried in the time stamp field 503 of the first continuity packet 500a to the node 101, and back to the node 100 in the data field 504 of the second continuity packet 500b, $t_1$ is the value of the clock of the node 101 at the time of transmission of the second continuity packet 500b, carried to the node 100 in the time stamp field 503 of the second continuity packet 500b, and $t_2$ is the current value of the clock 200. The current value of the clock 200 may also be thought of as the time of receipt by the node 100 of the second continuity packet 500b, $t_2 - t_0$ is the round-trip transit delay time of a packet, traveling from the node 100 to the node 101 and back again, and $$\frac{t_2 - t_0}{2}$$

is the one-way transit delay time between the nodes 100 and 101. Thus $$t_1 + \frac{t_2 - t_0}{2}$$

represents the reading of the clock of the node 101 compensated for the one-way transit delay. Consequently, if the clocks of the two nodes 100 and 101 are synchronized, $A_0$ equals zero.

The difference calculator 204 stores the calculated asynchrony $A_0$, also as indicated in the block 308. The asynchrony $A_0$ becomes available from storage to the delay calculator 205. Alternatively, the asynchrony $A_0$ could be used by the logic and control unit 202 to synchronize the clock 200 of the node 100 with the clock of the node 101.

The delay calculator 205 uses the asynchron $A_0$ in computing the transit delay undergone by packets in traversing the call path from the node 101 to the node 100. That calculation is indicated in block 309. The delay calculator 205 computes the transit delay as $$D_0 = t_y - A_0 - t_x$$

where $D_0$ represents the transit delay, $t_x$ is the value of the clock of the node 101 at the time of transmission of the subject packet from the node 101, carried to the node 100 in the time stamp field 503 of the subject packet, $t_y$ is the current value of the clock 200 of the node 100, and can also be thought of as the time of receipt of the subject packet by the node 100, and $A_0$ is the asynchrony between the clocks of the nodes 100 and 101.

Because the subject packet here is the third continuity packet 500c, $t_y = t_2$ and $t_x = t_1$. Hence $$D_0 = \frac{t_2 - t_0}{2},$$

or half the round-trip transit delay.

When it has calculated the delay $D_0$, the delay calculator 205 provides the value $D_0$ to the logic and control circuit 202, which compares the value $D_0$ against a maximum acceptable delay, as indicated in block 310. The maximum acceptable delay is the maximum delay acceptable in speech before people find it objectionable, for example 250 ms.

If the delay $D_0$ exceeds the maximum acceptable delay value, the logic and control unit 202 responds by undertaking the conventional actions to drop the call, as suggested in the block 312.

If the delay $D_0$ does not exceed the maximum acceptable delay value, the logic and control unit 202 checks whether the other node 101 has dropped the call, as indicated in block 311. This check may, for example, involve checking whether the call path for that call has been taken down. If the other node 101 has dropped the call, the node 100 likewise drops the call, at the block 312. If the node 101 has not dropped the call, the node 100 proceeds to process the call.

Returning to a consideration of FIG. 4A, following transmission of the second continuity packet 500b, at the block 404, the node 101 awaits receipt of the third continuity packet 500c from the node 100, as indicated in block 405.

Figure 4B:
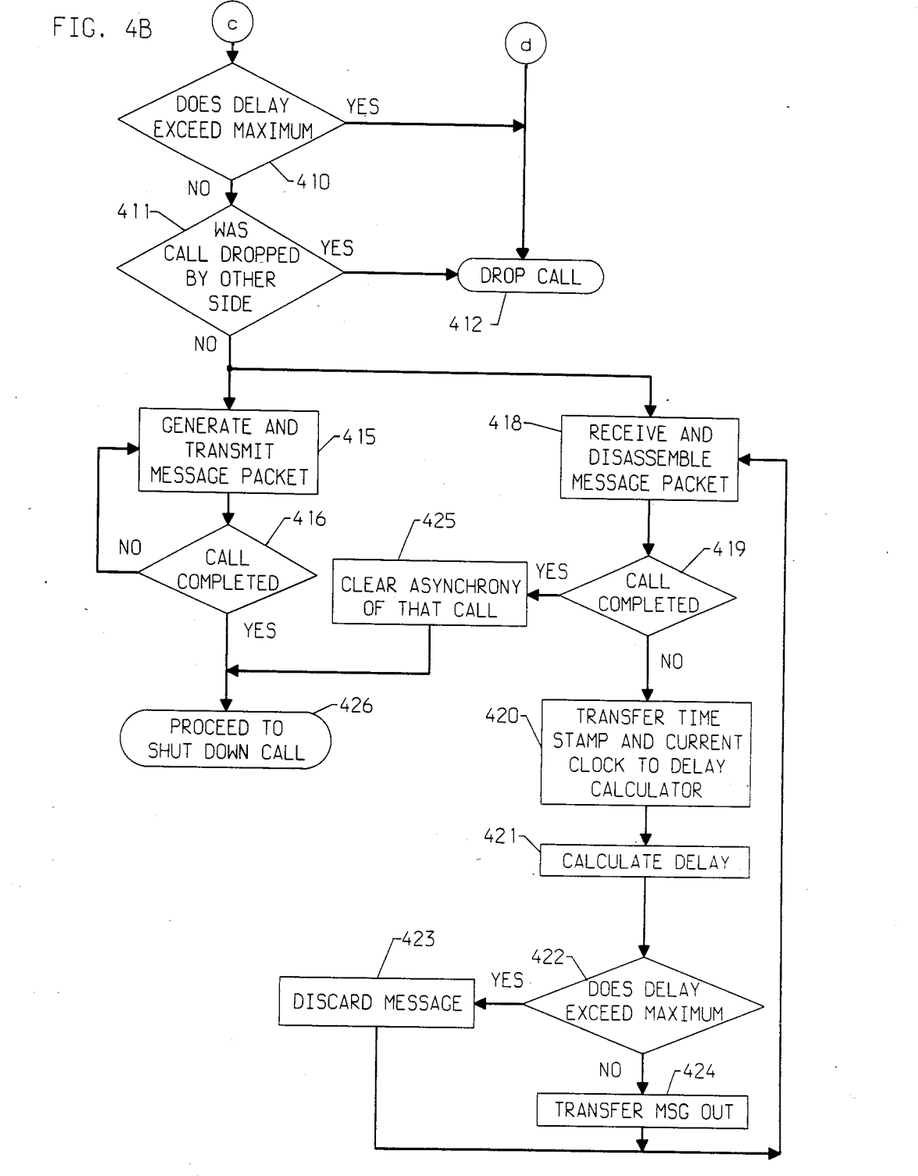

Should the node 101 not receive the third continuity packet 500c within a predetermined period of time, again specified by a timeout timer, for example, the node 101 will drop the call, at the block 412. This condition is highly unlikely, however, because the continuity of the call path from the node 100 to the node 101 has already been tested by the first continuity packet 500a.

Upon receipt of the third continuity packet 500c within the predetermined time, the node 101 disassembles the packet 500c, as indicated in block 406, and then performs actions analogous to those performed by the node 100 at the blocks 307-310, to obtain the asynchrony between the clocks of the two nodes 100 and 101, to determine the transit delay undergone by the packet 500c, and to determine whether the call should be dropped because the delay of the packet 500c exceeds the maximum acceptable delay, as indicated in blocks 407-410.

Of course, the node 101 uses different data in its calculations. Thus the difference calculator of the node 101 computes the asynchrony as $$A_1 = t_3 - \left(t_2 + \frac{t_3 - t_1}{2}\right) = \frac{t_3 + t_1}{2} - t_2$$

where $A_1$ represents the asynchrony between the clocks and is equivalent to $A_0$, $t_1$ is the value of the clock of the node 101 at the time of transmission of the second continuity packet 500b, carried in the time stamp field 503 of the second continuity packet 500b to the node 100, and back to the node 101 in the data field 504 of the third continuity packet 500c, $t_2$ is the value of the clock 200 of the node 100 at the time of transmission of the third continuity packet 500c, carried to the node 101 in the time stamp field 503 of the third continuity packet 500c, and $t_3$ is the current value of the clock of the node 101. The current value of the clock of the node 101 may also be thought of as the time of receipt by the node 101 of the third continuity packet 500c, $t_3 - t_1$ is the round-trip transit delay time of a packet, traveling from the node 101 to the node 100 and back again, and $$\frac{t_3 - t_1}{2}$$

is the one-way transit delay time between the nodes 100 and 101. $t_3 - t_1$ is equivalent to $t_2 - t_0$, and hence $$\frac{t_3 - t_1}{2}$$

is equivalent to $$\frac{t_2 - t_0}{2}.$$

$$t_2 + \frac{t_3 - t_1}{2}$$

represent the reading of the clock 200 of the node 100 compensated for the one-way transit delay. Thus again, if the clocks of the two nodes 100 and 101 are synchronized, $A_1$ equals zero.

The delay calculator of the node 101 computes the transit delay of packets traversing the call path from the node 100 to the node 101 as $$D_1 = t_z - A_1 - t_w$$

where $D_1$ represents the transit delay, $t_w$ is the value of the clock 200 of the node 100 at the time of transmission of the subject packet from the node 100, carried to the node 101 in the time stamp field 503 of the subject packet, $t_z$ is current value of the clock of the node 101, and can also be thought of as the time of receipt of the subject packet by the node 101, and $A_1$ is the asynchrony between the clocks of the nodes 100 and 101.

When it has calculated the delay $D_1$, the delay calculator of the node 101 provides the value $D_1$ to the logic and control circuit of the node 101 for comparison against the maximum acceptable delay, at the block 410. If the delay $D_1$ exceeds the maximum acceptable delay, the call is dropped, at the block 412. If the delay $D_1$ does not exceed the maximum acceptable delay, a check is made of whether the node 100 dropped the call: if so, the call is likewise dropped by the node 101; if not, the node 101 proceeds to handle the call.

Subsequent to setting up the call, as was described above in conjunction with the blocks 300-312 and 400-412, both nodes 100 and 101 follow like actions in handling the call, as can be seen from comparison of blocks 315-325 of FIG. 3B and blocks 415-425 of FIG. 4B. Therefore only the operation of the node 100 in handling the call will be discussed, with the understanding that the node 101 performs parallel actions.

Figure 6:
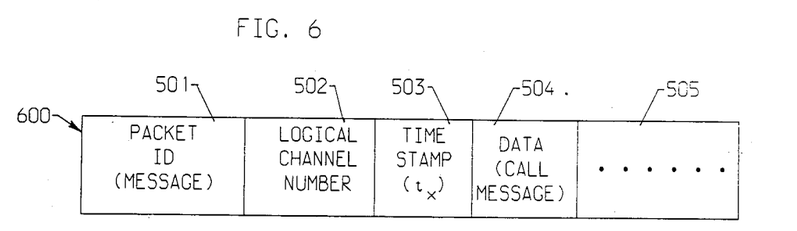
FIG. 6 is a logical configuration diagram of message packets of the network of FIG. 1.

Returning to FIG. 3, the node 100 generates message packets containing call message signals received from the subtending communicating unit 120, and transmits the message packets across the call path to the node 101, as indicated in block 315. A message packet, designated by the number 600, is shown diagramed in FIG. 6. The message packet 600 is assembled from the same fields 501-505 as the continuity packets 500 of FIGS. 5A-C. The message packet 600 differs from the continuity packets 500 in that its packet ID field 501 identifies it as either a data packet or a voice packet, and its data field 504 carries either the data or the digitalized call signals received from the communicating unit 120, respectively. Each message packet 600 carries in its time stamp field 503 the current reading of the clock of the terminal node that generated the packet—in this case the clock 200 of the node 100—at the time of transmission of the packet.

Returning to FIG. 3B, following the transmission of a message packet 600, the node 100 checks whether the call has been completed, as indicated in block 316. The check may involve determining whether the communicating unit 120 has signaled completion of the call and all message signals received from the communicating unit 120 have been transmitted to the node 101. If the call has not been completed, the node 101 returns to the block 315 to generate another message packet 600 and transmit it to the node 101.

Upon determining that the call has been completed, the node 100 proceeds to undertake conventional activities to shut down the call, as suggested in block 326. Activities involved in shutting down the call include transmitting one or more call termination packets to the network 10 and to the node 101 to notify them that the call has been completed and to cause them to take down the call path.

While the node 100 is generating message packets and transmitting them to the node 101, it is also receiving packets from the node 101, as indicated in block 318. These received packets include message packets 600 carrying call signals from the communicating device 121 for the communicating device 120. Upon receipt of a packet from the node 101, the node 100 disassembles it, also as indicated in the block 318, and checks whether the packet signifies completion of the call, as indicated in block 319. Call completion is signified, for example, by the receipt of a call termination packet from the node 101.

If call completion is not signified and the received packet is a voice packet 600, the retrieved contents of the time stamp field 503 of the packet 600 are transferred to the delay calculator 205, along with the current reading of the clock 200, as indicated in block 320. The current reading of the clock 200 is considered to indicate the time of reception of the packet 600.

Taking the time stamp, the current clock reading, and the asynchrony $A_0$ that was previously computed for the call by the difference calculator 204, the delay calculator 205 calculates the transit delay $D_0$ of the packet 600, as indicated in block 321. The formula for calculating $D_0$ was discussed previously.

The delay calculator 205 provides the transit delay $D_0$ to the logic and control unit 202, which compares the delay $D_0$ against the maximum acceptable delay, as indicated in block 322.

If the delay $D_0$ of the packet 600 exceeds the maximum acceptable delay, the call signals carried by that packet 600 in the data field 504 are discarded, as indicated in block 323. If the delay $D_0$ does not exceed the maximum acceptable delay, the call signals are transferred out to the communicating device 120, as suggested in block 324. Following disposal of the call signals by either discarding or transferral, operation returns to the block 318 to receive and disassemble the next packet.

When call completion is indicated at the block 319, the value of the asynchrony $A_0$ of the call that is stored at the node 100 is cleared from memory, as suggested in block 325. The node 100 then proceeds to undertake conventional activities to shut down the call, at the block 326.

Of course, various changes and modifications to the illustrative embodiment described above will be apparent to those skilled in the art. For example, in certain networks such as those wherein a terminal node contemporaneously communicates with only one other terminal node, the computed asynchrony between the clocks of the communicating nodes may be used to adjust, i.e., synchronize, the clocks and thereby eliminate compensation for asynchrony from the transit delay calculation. Or a virtual clock may be created for each call at each node to replace the delay calculator. The value of the virtual clock is the current value of the clock from which time stamps are generated, adjusted for the asynchrony between clocks of the two nodes, less the maximum acceptable delay. The call's virtual clock is then compared against the time stamp of the call's message packets and the packet's message signals are discarded if the value of the time stamp does not exceed the value of the virtual clock. Such changes and modifications can be made without departing from the spirit and the scope of the invention and without diminishing its attendant advantages. It is therefore intended that such changes and modifications be covered by the following claims

What is claimed is:

1. In a communication system comprising a first and a second communication interface coupled by a transmission path, method of determining round-trip signal transmission delay through the path, comprising the steps of:
   transmitting through the path a first signal indicating time of its transmission from the first interface to the second interface;
   transmitting through the path a second signal from the second interface to the first interface in response to receipt of the first signal at the second interface, the second signal indicating the time of transmittal of the first signal; and
   determining, in response to receipt of the second signal at the first interface, the difference between the time of transmittal of the first signal and the time of receipt of the second signal to obtain the round-trip transmission delay through the path.

2. The method of claim 1 further comprising the step of:
   approximating the one-way transmission delay through the path as half of the round-trip delay.

3. The method of claim 1 wherein the step of transmitting a second signal comprises the step of:
   transmitting through the path a second signal from the second interface to the first interface, the second signal indicating the time of transmission of the first signal and the time of transmission of the second signal;
   the method further comprising the steps of:
   transmitting through the path a third signal from the first interface to the second interface in response to receipt of the second signal at the first interface, the third signal indicating the time of transmittal of the second signal; and
   determining, in response to receipt of the third signal at the second interface, the difference between the time of transmittal of the second signal and the time of receipt of the third signal to obtain at the second interface the round-trip transmission delay through the path.

4. The method of claim 3 further comprising the step of:
   approximating at the second interface the one-way transmission delay through the path as half of the round-trip delay obtained at the second interface.

5. In a communication system comprising a first and a second communication interface coupled by a transmission path, each interface including time-indicating means, method of synchronizing the time-indicating means of the first and the second interface, comprising the steps of:
   transmitting through the path a first signal indicating time of its transmittal from the first interface to the second interface;
   transmitting through the path a second signal from the second interface to the first interface in response to receipt of the first signal at the second interface, the second signal indicating the time of transmittal of the first signal and the time of transmittal of the second signal;
   determining, in response to receipt of the second signal at the first interface, the difference between the time of transmittal of the first signal and the time of receipt of the second signal to obtain the round-trip transmission delay through the path;
   determining the difference between the time of receipt of the second signal and the time of transmittal of the second signal plus half of the delay to obtain the time period of asynchrony between the time-indicating means of the first and the second interface; and
   adjusting the time-indicating means of the first interface by the time period of asynchrony to synchronize the time-indicating means of the first and the second interface.

6. The method of claim 5 further comprising the steps of:
   transmitting through the path a third signal from the first interface to the second interface in response to receipt of the second signal at the first interface, the third signal indicating the time of transmittal of the second signal and the time of transmittal of the third signal;
   determining, in response to receipt of the third signal at the second interface, the difference between the time of transmittal of the second signal and the time of receipt of the third signal to obtain at the second interface the round-trip transmission delay through the path;
   determining the difference between the time of receipt of the third signal and the time of transmittal of the third signal plus half of the delay obtained at the second interface to obtain at the second interface the time period of asynchrony between the time-indicating means of the first and the second interface; and
   adjusting the time-indicating means of the second interface by the time period of asynchrony obtained at the second interface to synchronize the time-indicating means of the first and the second interface.

7. In a communication system comprising a first and a second communication interface interconnected by a transmission path, method of controlling communications passing between the first and the second interface, comprising the steps of:
   transmitting through the path a first signal indicating time of its transmittal from the first interface to the second interface;
   transmitting through the path, in response to receipt of the first signal at the second interface, a second signal from the second interface to the first interface, the second signal indicating the time of transmittal of the first signal;
   determining, in response to receipt of the second signal at the first interface, the difference between the time of transmittal of the first signal and the time of receipt of the second signal to obtain the round-trip transmission delay through the path;

comparing half of the transmission delay with a predetermined maximum acceptable one-way delay; and ceasing further transmissions between the first and second interface over the path when the half of the transmission delay exceeds the predetermined delay.

8. The method of claim 7 wherein the step of transmitting a second signal comprises the step of:

transmitting through the path a second signal from the second interface to the first interface, the second signal indicating the time of transmittal of the first signal and the time of transmittal of the second signal;

the method further comprising the steps of:

transmitting through the path a third signal from the first interface to the second interface in response to receipt of the second signal at the first interface, the third signal indicating the time of transmittal of the second signal;

determining, in response to receipt of the third signal at the second interface, the difference between the time of transmittal of the second signal and the time of receipt of the third signal to obtain at the second interface the round-trip transmission delay through the path;

comparing half of the transmission delay obtained at the second interface with the predetermined delay; and ceasing further transmissions between the first and the second interface over the path when the half of the transmission delay obtained at the second interface exceeds the predetermined delay.

9. The method of claim 7 further comprising the steps of:

determining the difference between the time of receipt of the second signal and the time of transmittal of the second signal plus the half of the transmission delay to obtain the time period of asynchrony between means included in each of the first and the second interfaces for indicating time of transmittal and receipt of signals;

receiving at the first interface a third signal transmitted through the path by the second interface when the transmission delay does not exceed the predetermined delay, the third signal indicating the time of its transmittal;

comparing the half of the predetermined delay with the difference between the time of transmittal and the time of receipt of the third signal adjusted for the time period of asynchrony; and discarding the third signal when the adjusted difference between the times of transmittal and receipt of the third signal exceeds the predetermined delay.

10. The method of claim 8 further comprising the steps of:

determining the difference between the time of receipt of the third signal and the time of transmittal of the third signal plus the half of the transmission delay obtained at the second interface to obtain the time period of asynchrony between means included in each of the first and the second interfaces for indicating time of transmittal and receipt of signals;

receiving at the second interface a fourth signal transmitted through the path by the first interface when the half of the transmission delay obtained at the second interface does not exceed the predetermined delay, the fourth signal indicating the time of its transmittal;

comparing the predetermined delay with the difference between the time of transmittal and the time of receipt of the fourth signal adjusted for the time period of asynchrony; and discarding the fourth signal when the adjusted difference between the times of transmittal and receipt of the fourth signal exceeds the predetermined delay.

11. In a packet switching network that includes a first communication node having a first clock and a second communication node having a second clock, the nodes interconnected by at least one transmission path, method of controlling communications between the nodes comprising the steps of:

setting up a communication path over one of the at least one transmission path;

transmitting over the communication path a first packet from the first node to the second node, the first packet bearing a first time stamp that represents the time indicated by the first clock at transmittal of the first packet;

transmitting over the communication path a second packet from the second node to the first node in response to receipt of the first packet at the second node, the second packet bearing the first stamp and a second time stamp that represents the time indicated by the second clock at transmittal of the second packet;

determining at the first node, in response to receipt of the second packet at the first node, the time period of asynchrony between the first and second clocks as half of the sum of the first stamp and the time indicated by the first clock at receipt of the second packet, less the second stamp;

determining at the first node the one-way transmission delay through the communication path as the time indicated by the first clock at receipt of the second packet less the sum of the time period of asynchrony determined at the first node and the second stamp;

comparing the transmission delay determined at the first node with a predetermined maximum acceptable one-way delay; and taking down the communication path when the transmission delay determined at the first node exceeds the predetermined delay.

12. The method of claim 11 further comprising the steps of:

transmitting over the communication path a third packet from the first node to the second node in response to receipt of the second packet, the third packet bearing the second time stamp and a third time stamp that represents the time indicated by the first clock at transmittal of the third packet;

determining at the second node, in response to receipt of the third packet at the first node, the time period of asynchrony between the first and second clocks as half of the sum of the second stamp and the time indicated by the second clock at receipt of the third packet, less the third stamp;

determining at the second node the one-way transmission delay through the communication path as the time indicated by the second clock at receipt of the third packet less the sum of the time period of asynchrony determined at the second node and the third stamp;

comparing the transmission delay determined at the second node with the predetermined delay; and taking down the communication path when the transmission delay determined at the second node exceeds the predetermined delay.

13. The method of claim 11 further comprising the steps of:

transmitting over the communication path a third packet from the second node to the first node when the communication path has not been taken down, the third packet bearing a third time stamp that represents the time indicated by the second clock at transmittal of the third packet;

determining, in response to receipt of the third packet at the first node, the transmission delay of the third packet as the time indicated by the first clock at receipt of the third packet less the sum of the time period of asynchrony determined at the first node and the third stamp;

comparing the delay of the third packet with the predetermined delay; and discarding the third packet when the delay of the third packet exceeds the predetermined delay.

14. The method of claim 12 further comprising the steps of:

transmitting over the communication path a fourth packet from the first node to the second node when the communication path has not been taken down, the fourth packet bearing a fourth time stamp that represents the time indicated by the first clock at transmittal of the fourth packet;

determining, in response to receipt of the fourth packet at the second node, the transmission delay of the fourth packet as the time indicated by the first clock at receipt of the fourth packet less the sum of the time period of asynchrony determined at the second node and the fourth stamp;

comparing the delay of the fourth packet with the predetermined delay; and discarding the fourth packet when the delay of the fourth packet exceeds the predetermined delay.

15. In a communication system that includes a first and a second communication interface coupled by a transmission path, apparatus for determining round-trip signal transmission delay through the path comprising:

means associated with the first interface for transmitting through the path a first signal indicating time of its transmittal from the first interface to the second interface;

means associated with the second interface and responsive to receipt of the first signal at the second interface for transmitting through the path a second signal from the second interface to the first interface, the second signal indicating the time of transmittal of the first signal; and first means associated with the first interface and responsive to receipt of the second signal at the first interface for determining the difference between the time of transmittal of the first signal and the time of receipt of the second signal to obtain the round-trip transmission delay.

16. The apparatus of claim 15 wherein the first means further comprise:

means for determining half of the round-trip transmission delay to obtain an approximate one-way transmission delay through the path.

17. The apparatus of claim 15 wherein the transmitting means associated with the second interface further comprise:

means for transmitting the second signal such that the second signal further indicates the time of transmittal of the second signal;

wherein the transmitting means associated with the first interface further comprise:

means for transmitting through the path a third signal from the first interface to the second interface in response to receipt of the second signal at the first interface, the third signal indicating the time of transmittal of the second signal;

the apparatus further comprising:

second means associated with the second interface and responsive to receipt of the third signal at the second interface for determining the difference between the time of transmittal of the second signal and the time of receipt of the third signal to obtain the round-trip transmission delay at the second interface.

18. The apparatus of claim 17 wherein the second means further comprise:

means for determining half of the round-trip transmission delay to obtain at the second interface an approximate one-way transmission delay through the path.

19. The apparatus of claim 15 further comprising:

means cooperative with the first means for comparing half of the transmission delay with a predetermined maximum acceptable one-way delay; and means associated with the first interface and responsive to the comparing means for stopping further transmissions to the second interface over the path when the half of the transmission delay exceeds the predetermined delay.

20. The apparatus of claim 17 further comprising:

means cooperative with the second means for comparing half of the transmission delay obtained at the second interface with a predetermined maximum acceptable one-way delay; and means associated with the second interface and responsive to the comparing means for stopping further transmissions to the first interface over the path when the half of the transmission delay exceeds the predetermined delay.

21. A first communication interface for determining round-trip signal transmission delay through a transmission path of a communication system that includes the first and a like second communication interface connected by the the path, the first interface comprising:

means for transmitting through the path a first signal indicating time of its transmittal from the first interface to the second interface;

means, responsive to receipt of a second signal transmitted by the second interface to the first interface through the path upon receipt by the second interface of the first signal, the second signal indicating the time of transmittal of the first signal, for determining the difference between the time of transmittal of the first signal and the time of receipt of the second signal to obtain the round-trip transmission delay through the path.

22. The interface of claim 21 wherein the transmitting means further comprise:

means, responsive to receipt of a second signal transmitted by the second interface to the first interface through the path upon receipt by the second interface of the first signal, the second signal indicating the time of transmittal of the first signal and the time of transmittal of the second signal, for transmitting through the path to the second interface a third signal indicating the time of transmittal of the second signal.

23. The interface of claim 21 further comprising:

means cooperative with the determining means for comparing half of the transmission delay with a predetermined maximum acceptable one-way delay; and means responsive to the comparing means for stopping further transmission to the second interface over the path when the half of the transmission delay exceeds the predetermined delay.

24. The interface of claim 21 wherein the determining means further comprise:

means for determining half of the round-trip transmission delay to obtain an approximate one-way transmission delay through the path.

25. The interface of claim 23 wherein the interface further comprises:

first time-indicating means for indicating times of transmittal and receipt of signals to the transmitting means and to the determining means, and means, cooperative with the determining means and the first time-indicating means and responsive to receipt of a second signal transmitted by the second interface through the path upon receipt by the second interface of the first signal, the second signal indicating the time of transmittal of the first signal and the time of transmittal of the second signal, for determining the difference between the time of receipt of the second signal and the time of transmittal of the second signal plus half of the transmission delay to obtain the time period of asynchrony between the first time-indicating means and a second time-indicating means included in the second interface;

wherein the determining means further comprise:

means, cooperative with the first time-indicating means and with the means to obtain the time period of asynchrony, and responsive to receipt of a third signal transmitted through the path by the second means, when the transmission delay does not exceed the predetermined delay, the third signal indicating the time of its transmission, for determining the difference between the time of transmittal and the time of receipt of the third signal and for adjusting this difference by the time period of asynchrony to obtain the one-way transmission delay of the third signal;

wherein the comparing means further comprise:

means cooperative with the determining means for comparing the delay of the third signal with the predetermined delay; and wherein the means for stopping further transmission further comprise:

means for discarding the third signal when the delay of the third signal exceeds the predetermined delay.

26. A second interface for determining round-trip signal transmission delay through a transmission path of a communication system that includes the second and a like first communication interface connected by the path, the second interface comprising:

means, responsive to receipt by the second interface of a first signal transmitted through the path by the first interface, the first signal indicating time of its transmittal from the first interface, for transmitting through the path to the first interface a second signal indicating the time of transmittal of the first signal and the time of transmittal of the second signal;

means, responsive to receipt by the second interface of a third signal transmitted through the path by the first interface upon receipt of the second signal, the third signal indicating the time of transmittal of the second signal, for determining the difference between the time of transmittal of the second signal and the time of receipt of the third signal to obtain the round-trip transmission delay through the path.

27. The interface of claim 26 further comprising:

means cooperative with the determining means for comparing half of the transmission delay with a predetermined maximum acceptable one-way delay; and means responsive to the comparing means for stopping further transmission to the first interface over the path when the half of the transmission delay exceeds the predetermined delay.

28. The interface of claim 27 wherein the determining means further comprise:

means for determining half of the round-trip transmission delay to obtain an approximate one-way transmission delay through the path.

29. The interface of claim 27 wherein the interface further comprises:

second time-indicating means for indicating times of transmittal and receipt of signals to the transmitting means and to the determining means, and means, cooperative with the determining means and the second time-indicating means, and responsive to receipt of a third signal transmitted through the path by the first interface upon receipt by the first interface of the second signal, the third signal indicating the time of transmittal of the second signal and the time of transmittal of the third signal, for determining the difference between the time of receipt of the third signal and the time of transmittal of the third signal plus half of the transmission delay to obtain the time period of asynchrony between the second time-indicating means and a first time-indicating means included in the first interface;

wherein the determining means further comprise:

means, cooperative with the second time-indicating means and with the means to obtain the time period of asynchrony, and responsive to receipt of a fourth signal transmitted through the path by the first means, when the transmission delay does not exceed the predetermined delay, the fourth signal indicating the time of its transmission, for determining the difference between the time of transmittal and the time of receipt of the fourth signal and for adjusting this difference by the time period of asynchrony to obtain the one-way transmission delay of the fourth signal;

wherein the comparing means further comprise:

means cooperative with the determining means for comparing the delay of the fourth signal with the predetermined delay; and wherein the means for stopping further transmission further comprise:

means for discarding the fourth signal when the delay of the fourth signal exceeds the predetermined delay.

* * * * *